(12) United States Patent
Chau

(10) Patent No.: US 8,965,040 B1
(45) Date of Patent: *Feb. 24, 2015

(54) USER CORRECTION OF POSE FOR STREET-LEVEL IMAGES

(71) Applicant: Google Inc., Mountain View, CA (US)

(72) Inventor: Stephen Chau, Stanford, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/182,872

(22) Filed: Feb. 18, 2014

Related U.S. Application Data

(63) Continuation of application No. 13/185,870, filed on Jul. 19, 2011, now Pat. No. 8,699,800.

(51) Int. Cl.
  *G06K 9/00* (2006.01)
  *G06K 9/52* (2006.01)

(52) U.S. Cl.
  CPC ....................................... *G06K 9/52* (2013.01)
  USPC .......................................................... 382/100

(58) Field of Classification Search
  USPC .......................................................... 382/100
  See application file for complete search history.

(56) References Cited

U.S. PATENT DOCUMENTS

| | | | | | |
|---|---|---|---|---|---|
| 5,760,742 | A | * | 6/1998 | Branch et al. | 342/457 |
| 5,839,088 | A | * | 11/1998 | Hancock et al. | 701/468 |
| 5,897,605 | A | * | 4/1999 | Kohli et al. | 701/469 |
| 5,999,878 | A | | 12/1999 | Hanson et al. | |
| 6,041,280 | A | * | 3/2000 | Kohli et al. | 701/446 |
| 2011/0064312 | A1 | * | 3/2011 | Janky et al. | 382/195 |
| 2011/0235923 | A1 | | 9/2011 | Weisenburger et al. | |
| 2011/0249860 | A1 | | 10/2011 | Chen et al. | |

* cited by examiner

*Primary Examiner* — Alex Liew
(74) *Attorney, Agent, or Firm* — Lerner, David, Littenberg, Krumholz & Mentlik, LLP

(57) ABSTRACT

A system, computer-implemented method and computer-readable medium for correcting existing coordinates of an image. The image is provided to the client device, the image associated with a first geographic coordinate. A second geographic coordinate is received from the client device representing a location of the client device and an indication that the image resembles surroundings of the client device at the second geographic coordinate, where the second geographic coordinate is different from the first second geographic coordinate. A determination is made as to whether the received second geographic coordinate more accurately represents a location of a camera that took the image than the first geographic coordinate. When the received second coordinate is determined to be more accurate than the first coordinate, updating the first geographic coordinate associated with the image according to the received second geographic coordinate.

20 Claims, 6 Drawing Sheets

US 8,965,040 B1

USER CORRECTION OF POSE FOR STREET-LEVEL IMAGES

CROSS-REFERENCE TO RELATED APPLICATIONS

This application is a continuation of U.S. application Ser. No. 13/185,870, filed on Jul. 19, 2011, the disclosure of which is incorporated herein by reference.

BACKGROUND OF THE INVENTION

As mobile devices become accessible and popular, users use them to view cities, neighborhoods and blocks. For example, instead of using a conventional map, a user is able to download a map of a city onto a mobile device that includes real-world images geocoded and specific locations. Those geocoded real-world images may be collected from a panoramic camera and a GPS device affixed to a vehicle in motion. A three dimensional model may also be collected using a laser sensor affixed on a vehicle.

However, the collected data may include noise that distorts the reconstructed image. For example, there may be a discrepancy between a camera and a GPS device, or a laser sensor and a GPS device when the real-world image is collected. This results in an offset between the coordinates of the real-world location, and the coordinates of the reconstructed image of the real-world location that is downloaded onto a mobile device.

BRIEF SUMMARY OF THE INVENTION

A system, computer-implemented method and computer-readable medium for correcting existing coordinates of an image. The image is provided to the client device, the image associated with a first geographic coordinate. A second geographic coordinate is received from the client device representing a location of the client device and an indication that the image resembles surroundings of the client device at the second geographic coordinate, where the second geographic coordinate is different from the first second geographic coordinate. A determination is made as to whether the received second geographic coordinate more accurately represents a location of a camera that took the image than the first geographic coordinate. When the received second coordinate is determined to be more accurate than the first coordinate, updating the first geographic coordinate associated with the image according to the received second geographic coordinate.

Further embodiments, features, and advantages of the invention, as well as the structure and operation of the various embodiments of the invention are described in detail below with reference to the accompanying drawings.

BRIEF DESCRIPTION OF THE DRAWINGS

The accompanying drawings, which are incorporated herein and form a part of the specification, illustrate embodiments of the invention and, together with the description, further serve to explain the principles of the invention and to enable a person skilled in the relevant art to make and use the invention.

Figure 1:
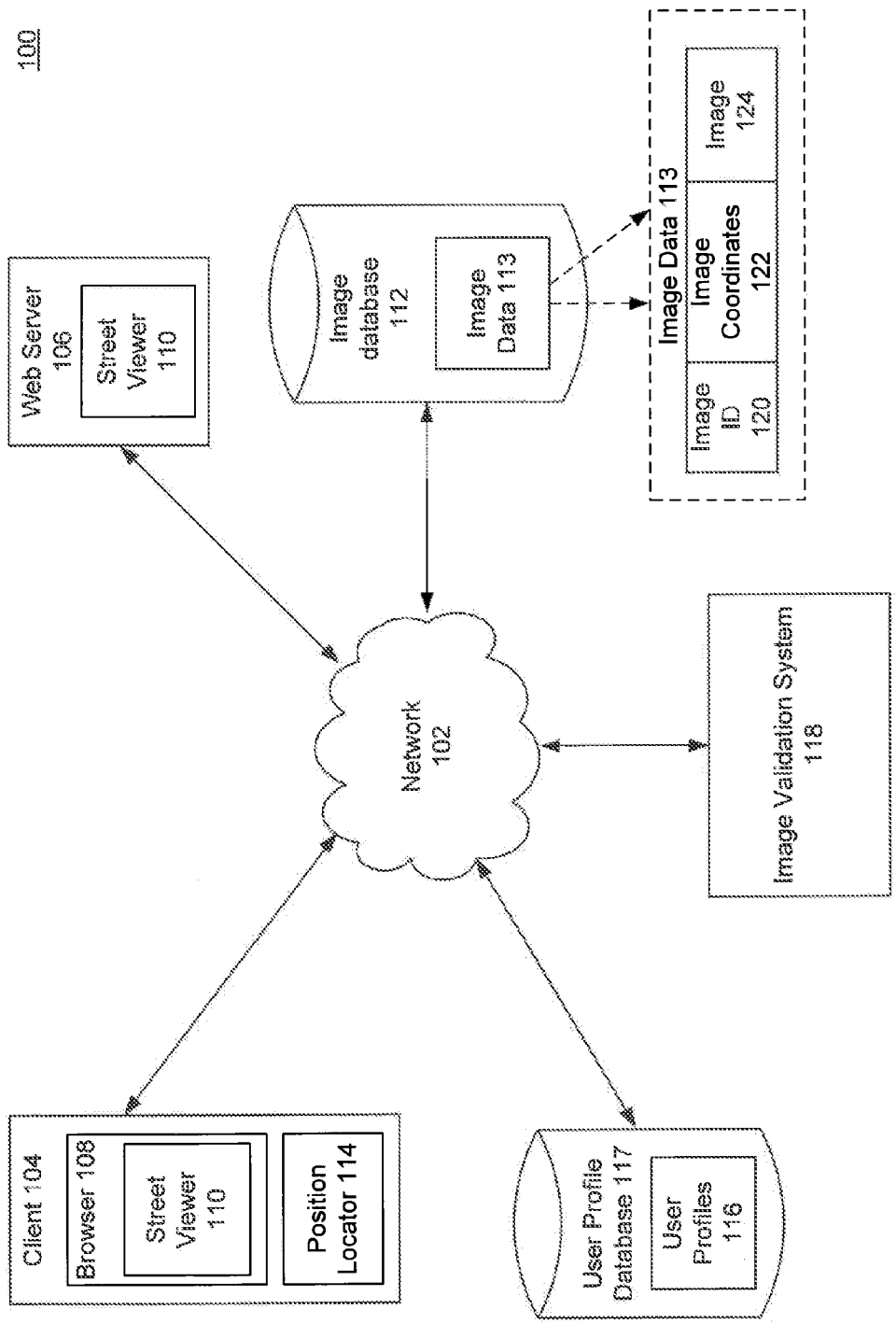
FIG. 1 is a block diagram showing a client-server system in which embodiments of the invention can be implemented.

The invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION OF EMBODIMENTS

The following detailed description refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

The invention adjusts the geographic coordinates of an image that is presented to a user using an electronic device. For example, a user may download an image of a location onto am electronic device, where the image may not have accurate geographic coordinates that correspond to the location of the image in the world. A user may attempt to correct the geographic coordinates that are associated with the image by using the electronic device to determine the geographic coordinates of a location that is depicted on the image.

A user causes electronic device to submit the geographic coordinates determined by the electronic device to an image validation system for adjusting the geographic coordinates that were downloaded with the image. The image validation system may adjust the geographic coordinates of the image if it determines that the geographic coordinates determined by the electronic device are more accurate than the geographic coordinates that were received by the electronic device with the image.

System

FIG. 1 is a block diagram of a client-server environment 100. Client-server environment 100 includes one or more networks 102, clients 104, and web servers 106.

Network 102 may be any network or combination of networks that can carry data communications. Such a network 102 may include, but is not limited to, a local area network, metropolitan area network, and/or wide area network such as the Internet. Network 102 can support protocols and technology including, but not limited to, World Wide Web (or simply the "Web") protocols and/or services. Intermediate web servers, gateways, or other servers may be provided between components of the system shown in FIG. 1, depending upon a particular application or environment.

Client 104 is an electronic device that is under a control of a user and is capable of requesting and receiving resources over network 102. Example clients 104 are personal computers, mobile communication devices and tablet computers. Client 104 typically includes an application, such as a web browser (or simply browser) 108. Browser 108 facilitates the sending and receiving of data and resources over network 102 and the displaying of data on client 104.

A user uses browser 108 to request resources over network 102. A user requests resources either by typing the resource address associated with resource. In response to a request, web server 106 delivers resources as websites to client 104. When client receives a website from web server 106, client 104 uses browser 108 to display the website to the user.

Web server 106 is a computing device or an application executing on a computing device that helps deliver resources to clients 104. Resources are either stored on web server 106 or on another computing device that is accessible to web server 106 through network 102.

A street viewer 110 is an example of a resource that may be delivered to client 104 and viewed using browser 108. Street viewer 110 is hosted by web server 106 and may be accessed by client 104 using a resource address. When a website that includes street viewer 110 is downloaded onto client 104, street viewer 110 allows client 104 to display images of a real-world location on browser 108.

Street viewer 110 displays images of locations around the world. For example, street viewer 110 displays street-level imagery of cities, landmarks, street corners, museums, etc. Street viewer 110 accesses real-world images collected, for example, using a car equipped with a camera, a laser sensor, and a GPS device. When a car is driven around a neighborhood, the camera takes pictures of the neighborhood at configurable intervals, such as every "f" feet, or every "t" seconds.

Laser sensors (e.g., LIDAR sensors) generate a point cloud representation of the objects within the neighborhood. A point cloud representation is a representation of the dimensions of the real-world objects, such as buildings, facades, windows, etc. within the image. For example, a laser generates a beam that is aimed at different objects within a location, such as a neighborhood. The sensor associated with the laser collects the laser beam that is reflected from the real-world objects and generates a point cloud in the (x, y, z) coordinate system that is based on the collected laser beam. A person skilled in the art will appreciate that an "x" coordinate indicates the horizontal axis in the point cloud, a "y" coordinate indicates a vertical axis in the point cloud, and a "z" coordinate indicates a depth in the point cloud. Thus, when a laser sprays a laser beam onto the building, the resulting point cloud reflects the façade, roof, windows, doors, etc. that are of varying depths of the sprayed building. The person skilled in the art will appreciate that the denser the laser spray, the more accurate the point cloud of the actual real-world object is produced. Laser sensors may also determine a representation of a sky in the point cloud by identifying points in the point cloud that have an infinite "z" coordinate, as the laser does not reflect back to the laser sensor when the laser points at the sky. Laser sensors may also determine a representation of a road in a point cloud by determining a shape that has a constant or near constant "y" coordinate.

The GPS device collects the real-world coordinates that correspond to the image produced by a camera and a point cloud generated by a laser. For example, GPS device collects the real-world coordinates at the same time as a camera takes a picture.

In further embodiments, accuracy of the GPS data may be improved using wheel encoders installed on the vehicle, and the location data may be snapped to known locations of streets.

As mentioned above, the camera may successively collect images at various points along a path. In an example, the camera may be a panoramic camera with multiple image sensors that captures images from different directions coincidentally. The images may then be stitched together into a 360-degree panoramic image. The panoramic image may be associated with a geographic location collected by the GPS device at the time that the image was taken. Any three-dimensional laser data collected at that time may also be associated with the same geographic location.

For example, the point cloud may be used to generate a depth map representing three-dimensional data corresponding to respective pixels in the panoramic image. The depth map may include a numeric value corresponding to each pixel on the panoramic image. The numeric value represents a distance from the associated geographic location (collected by the GPS) to an object in three-dimensional space, such as a tree or building.

In an embodiment, a panorama of a real-world location may be generated. For example, the images are taken by a camera at concrete time or distance intervals. Those images are overlapped where necessary and are stitched together, as known to a person skilled in the relevant art. The stitching is subsequently blurred to create panoramic images of a street block or a city square.

Street viewer 110 also uses panoramic images to display a 360 degree panorama of a real-world location. When images are taken from one location as a starting point, and in a circular path, those images may be stitched together to create a 360 degree panorama. For example, a 360 degree panorama is created when the first and last image are taken of the same object, and are stitched together.

Image database 112 stores image data 113. Image data 113 includes image credentials, such as in a non-limiting example, an image of a real-world location 124, image identifier (also referred to as image ID) 120 associated with image 124 and image coordinates 122. Image 124 is a reconstructed image that was collected and reconstructed from the camera and laser data. In an example, image 124 may include both a panoramic image and corresponding depth map. Image coordinates 122 are coordinates associated with image 124 that may have been collected using the GPS device or another location sensing device. In an embodiment, image coordinates 122 may be in a latitude and longitude coordinate notation.

When street viewer 110 requests an image of a real-world locations, street viewer 110 sends coordinates for the real-world location to image database 112. Street viewer 110 obtains the coordinates, when, for example, a user is presented with a map of city or a city block, displayed as squares or rectangles and requests an image of the location by positioning the cursor on a particular location on the map. In an embodiment, street viewer 110 converts the coordinates indicated by the cursor into geographic coordinates such as a longitude and latitude coordinates and sends the request with those coordinates to image database 112 or to an intermediate web server, such as server 106, that in turn accesses image database 112.

Once image database 112 receives a request for an image, image database 112 identifies image 124 that is associated with image coordinates 122 are in proximity to match the coordinates included in the request message. Image database 112, or the intermediate web server then sends a response message that includes image 124, image coordinates 122, and image ID 120 for presentation to a user using client 104.

A person skilled in the art will appreciate that image database 112 may be any type of a memory storage device, such as a database, a server, a repository, or other storage device known to a person skilled in the relevant art.

Image database 112 may be included on web server 106 or another computing or storage device that communicates with web server 106 using network 102.

When images and their real-world coordinates are obtained using a camera, a laser sensor and a GPS device, the precise location of the images may be affected by noise. The noise makes image coordinates 122 of image 124 inaccurate. Noise may be caused by several factors, such as a GPS device losing contact with the satellite, such as when the car enters an urban canyon. An urban canyon is an area of the city that includes dense city blocks or structures, such as skyscrapers, and as a result may have reduced, intermittent or non-existent reception of a radio or a GPS signal. As a result, data collected in the urban canyon may include consistent camera and laser sensor data, but intermittent or non-existent data from a GPS device. As mentioned above, GPS device may be combined with other sources such as wheel encoders to determine the vehicle's location.

In that example, the speed of the car may be improperly calculated from a particularly imprecise wheel encoder data. This may result in image 124 stored in image database 112 and displayed by street viewer 110 being offset by a discrete distance from the actual real-world location of image 124.

Although conventional image reconstruction methods may compensate for the noise from the reduced or non-existent data, the noise may still be present in a reconstructed image. Because of the noise, the reconstructed image, such as image 124 may have incorrect image coordinates 122. The difference between image coordinates 122 and the actual location of the image may be a few feet or hundreds of feet. Unlike conventional systems where a user is forced to wait for an application upgrade that may correct a location of the image, a user using street viewer 110 may correct image coordinates 122. For example, a user may submit coordinates associated with a location of image 124 that corrects a discrepancy between image coordinates 122 when image 124 is using street viewer 110 and the actual location.

To submit the coordinates, client 104 includes a position locator 114. Example position locator 114 is an application that determines a real-world location of client 104. Position locator 114 may rely on a GPS device that, when optionally activated by a user, tracks the location of client 104. Position locator 114 may optionally also use other techniques, such as WiFi and mobile networks location detecting techniques to identify client 104's location.

A user uses position locator 114 to obtain real-world coordinates of image 124 displayed on client 104. The user may use the real-world coordinates of image 124 obtained using position locator 114 to correct image coordinates 122 stored in image database 112. For example, when a user walks to a particular corner of a city block, and determines that image 124 of the corner of the city block presented on street viewer 110 is different from the actual real-world location, a user may attempt to correct image coordinates 122 of image 124 using client 104. In one embodiment, the user may select an image 124 in street viewer 110 that resembles the user's surroundings. When the image presented in street viewer 110 resembles the user's surroundings, the user may indicate that the image resembles the user's surroundings by perhaps pressing a user interface button saying "this is my location." In response to that input, position locator 114 detects the location of client to obtain real-world coordinates corresponding to the image displayed in street viewer 110.

When position locator 114 captures the real-world coordinates that correspond to image 124 presented on street viewer 110, client 104 may optionally submit the real-world coordinates to supplement image coordinates 122 in image database 112. Image validation system 118 determines whether the real-world coordinates submitted by a user may improve the accuracy of image coordinates 122.

In an embodiment, a user may create a user profile 116 to submit real-world coordinates to validation system 118. A user profile includes user credentials. Example user credentials include login credentials, such as username and password, the number of images of real-world locations that a user attempted to validate, the success score of a user for validating the images, etc. User profile database 117 stores user profiles 116 associated with multiple users. User profile database may be included on web server 106 or another computing device that communicates with client 104 and web server 106 using network 102.

Figure 2:
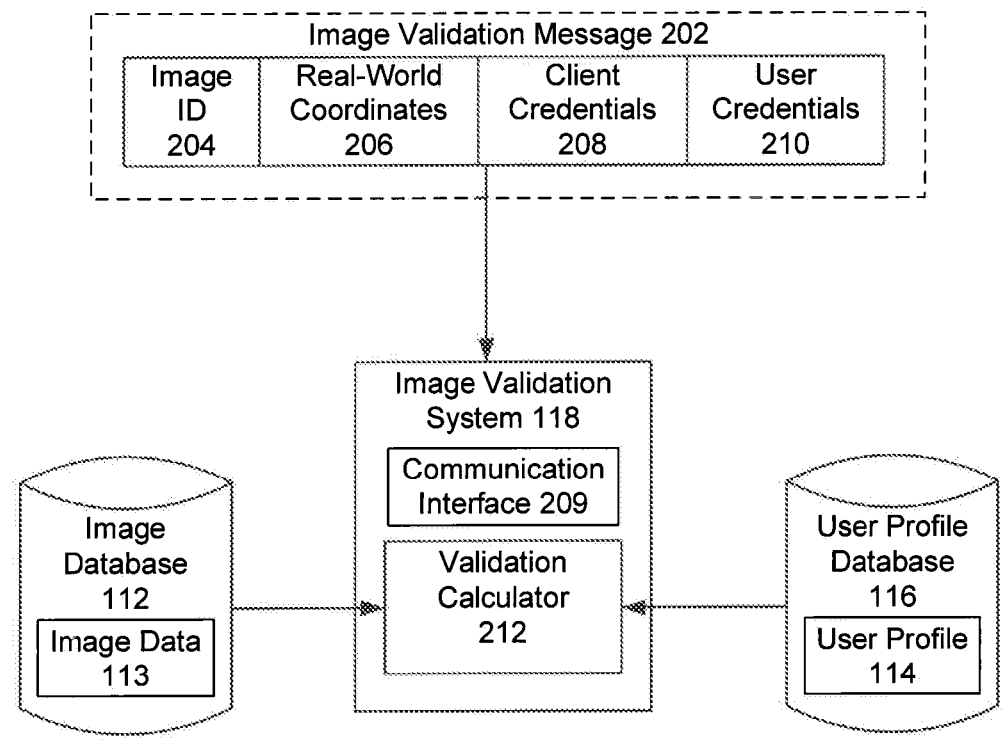
FIG. 2 is a block diagram showing an image validation system, according to an embodiment.

FIG. 2 is a block diagram 200 of an image validation system, according to an embodiment. Image validation system 118 includes validation calculator 212 and communication interface 209. Communication interface 209 communicates with clients 104, web servers 106, image database 112, user profile database 114 and other computing devices using via network 102. Image validation system 118 may be included on web server 106.

Image validation system 118 validates image coordinates 122 of images 124 in image database 112 that are presented to a user using street viewer 110. Image validation system 118 validates image coordinates 122 for an associated image 124 when image validation system 118 receives an image validation message 202. Image validation message 202 includes an image ID 204, real-world coordinates 206, client credentials 208 and user credentials 210.

Image ID 204 is an identifier for image 124 from image database 112 that was presented to a user using street viewer 110 and that a user sent to image validation system 118 due to inconsistent image coordinates 122.

Real-world coordinates 206 are geographic coordinates that a user obtained using position locator 114. Real-world coordinates 206 are the coordinates that a user obtained to supplement image coordinates 122 for image 124. In an embodiment, real-world coordinates 206 may be latitude and longitude coordinates.

Client credentials 208 include, without limitation, a type or brand of client 104, the network service that client 104 uses to connect to a GPS device, etc.

User credentials 210 identify a user who generated real-world coordinates 206 for image 124. User credentials 210 may include user identification such as, but not limited to a user name and user ID. Image validation system 118 may use user ID to retrieve user profile 116 from user profile database 117 for a user that used position locator 114 to generate real-world coordinates 206.

Image validation system 118 uses validation calculator 212 to determine whether real-world coordinates 206 provided by a user identify a more accurate location of image 124 than image coordinates 122 stored in image database 112. Validation calculator 212 uses a scoring function to validate real-world coordinates 206. The validation determines whether real-world coordinates 206 of image 124 are reliable and accurate or are nothing more than a background noise submitted by a user.

The scoring function evaluates credentials associated with image 124, including but not limited to real-world coordinates 206, client credentials 208 and user credentials 210. In one embodiment, the scoring function evaluates each credential separately and combines the score from each evaluation into a validation score. When the validation score is above a configurable threshold, image validation system 118 determines that real-world coordinates 206 may replace or be used to adjust image coordinates 122 associated with image 124. Once the determination is made, image validation system 118 sends real-world coordinates 206 to image database 112, where real-world coordinates 206 replace image coordinates 122 or cause them to be adjusted. In an embodiment, to adjust image coordinates 122, real-world coordinates may be aggregated, weighed or averaged with multiple coordinates submitted by multiple users or with other coordinates identified by the GPS device. In another embodiment, the weight of real-world coordinate 206 may be proportional to the validation score.

In an embodiment, image validation system 118 may also utilize the real-world coordinates that adjust image coordinates 122 associated with image 124 to adjust image coordinates for images that are adjacent or near to image 124. For example, a city block may include images A, B, C and D (image A, followed by image B, followed by image C, followed by image D), with users submitting real-world coordinates for images A and D to image validation system 118. If image validation system 118 determines that image coordinates for images A and D require adjustment, image validation system 118 may also adjust coordinates for images B and C, even though real-world coordinates for images B and C were not submitted by the users using clients 104. Therefore, while real-world coordinates may be unavailable to adjust image coordinates for images B and C, image validation system 118 may calculate the relative real-world coordinates with respect to real-world coordinates that users submitted for images A and D, and adjust image coordinates for imagers B and C based on those real-world coordinates.

When validation calculator 212 produces a validation score that is below the configurable threshold value, image validation system 118 discards real-world coordinates 206.

In an embodiment, when real-world coordinates 206 are used to adjust image coordinates 122, image validation system 118 may update user credentials 110 associated with user profile 116. For example, image validation system 118 sends an update user profile message to user profile database 117. User profile message may update the reputation score of a user having user credentials 110 because the user submitted real-world coordinates 206 that improved the accuracy of image coordinates 122 associated with image 124.

One criterion that validation calculator 212 may use the reputation of a user. When image validation system 118 receives image validation message 202, image validation system 118 may send a request to user profile database 117 for a user profile 116. For example, user validation system 118 uses communication interface 209 to send a user profile request message to user profile database 117 based on user credentials 110. In response to the user profile request message, user profile database 117 sends a response message that may include a reputation score of a user associated with user credentials 110 to image validation system 118.

The reputation score of the user identifies the frequency with which the user submits image validation messages 202 to image validation system 118 and the success rate of validation calculator 212 for generating a validation score above a predefined threshold. For example, the higher the reputation score of the user, the greater the probability that image validation system 118 receives reliable real-world coordinates 206 from a user for supplementing image coordinates 122.

Another criterion that validation calculator 212 uses is the popularity of the location for which image validation message 202 includes real-world coordinates 206. Validation calculator 212 determines the popularity of the location based on the number of times (e.g., frequency) multiple users request image 124 for display on street viewer 110. Validation calculator 212 may access popularity of the location from image data 113. For example, if the number of times image 124 was requested by users is above a predefined threshold, the image validation system 118 considers the image popular, and thus generates a low score. On the other hand, if image 124 is rarely requested, validation calculator 112 assigns a high score. A person skilled in the art will appreciate that validation calculator 122 may assign a range of popularity scores to image 124 based on the number of requests for image 124.

Typically, a popular image 124 has a greater probability of being accurate as it is presented multiple times to multiple users on street viewer 110. Even if the image is initially inaccurate, the popularity of image 124 indicates a greater probability that image 124 has been previously corrected by multiple users using street viewer 110. For this reason, geocodes associated with more popular images may be less likely to change in response to an image validation message 202.

For example, when a user submits real-world coordinates 206 that are associated with an image of the Eiffel Tower, image data 113 may include a popularity credential (not shown) that keeps track of the number of times users requested the image of the Eiffel Tower. Because the image of the Eiffel Tower was requested multiple times, there is a greater probability that image database 112 includes an accurate image of an Eiffel Tower. As such, the Eiffel Tower is accurately presented to users using street viewer 110. Because there is a greater probability that the image of an Eiffel Tower is accurate, validation calculator 212 may assign a lower score to an image of the Eiffel Tower. On the other hand, when a user submits real-world coordinates 206 for an image of a farmhouse in Kansas that is rarely requested by the users, validation calculator 212 may assign a higher score to an image of a farmhouse as it has a greater probability of being inaccurate.

Another criterion that validation calculator 212 may use is the location of image 124. A location score may be based on a density of the location that corresponds to real-world coordinates 206. For example, image validation system 118 may use real-world coordinates 206 to identify the location of image 124. When the location is a known urban canyon, validation calculator 212 may generate a higher location score to image 124 as there is a greater probability that the GPS device may have lost signal in the urban canyon and thus provide inaccurate image coordinates 122 for an image 124. However, when the location of the image is not located in the urban canyon, validation calculator 212 determines that there is a lower probability that the GPS device has generated inaccurate image coordinates 122. Validation calculator 212 thus generates a low location score. In this way, the density may correspond on a quantity of buildings (or tall buildings) in proximity to the location.

Another criterion that validation calculator 212 may use is the device type of client 104. For example, validation calculator 212 may generate a device score. The device score is based on a type of device that is client 104 that image validation system receives as in client credentials 208. A GPS device associated installed on some client devices may produce more accurate signals than other client device types. Because the accuracy of real-world coordinates 206 depends on the accuracy of the GPS device, the device score reflects the device type of a client 104 that is associated with a particular GPS device. In an embodiment, a device score associated with each client 104 may be configured or updated by a system administrator.

Finally, when the client's location is determined using network-based techniques, validation calculator 212 may use the connection type between client 104 and network 102 as another criterion. For example, the client's location may be triangulated the using the relative signal strength from cell towers or WiFi terminals with geographic known locations. Different network-based location detection techniques may have varying levels of accuracy. Given the different levels of accuracy, validation calculator 212 may assign different scores according the network-based location detection technique used.

A person skilled in the art will appreciate that the example criteria to determine a validation score is not limited to those embodiments and that other criteria to determine a validation score may be used.

Method

Figure 3:
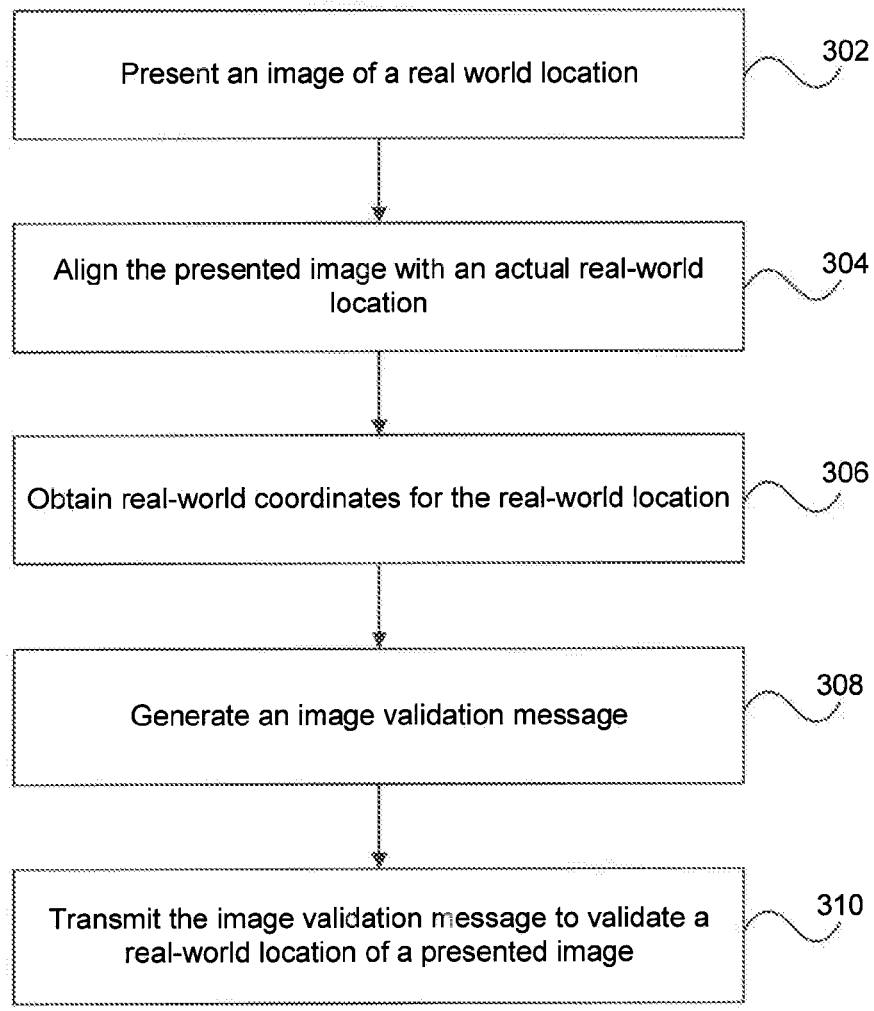
FIG. 3 is a flowchart showing a method for capturing real-world coordinates associated with an image of a location for validation, according to an embodiment.

FIG. 3 is a flowchart of a method 300 for submitting real-world coordinates associated with an image for validation, according to an embodiment.

Method 300 begins at a stage 302. At stage 302, an image of a real-world location is presented to a user. For example, a user may activate street viewer 110 and submit a request to image database 112 for image 124 of a particular location. In response, image database 112 may provide street viewer 110 with image 124 of a requested location for presentation to a user.

At stage 304, an image of a real-world location is aligned with an actual location. In one example, the user may navigate to the image in street viewer 110 that resembles the present location of the user. In another example, the user may move the mobile device to a location that resembles the image presented in street viewer 110.

At stage 306, coordinates of the real-world location are obtained. For example, position locator 114 uses a GPS device to obtain real-world coordinates 206 of the location depicted in image 124. In an embodiment, a user may affirmatively activate position locator 114 to obtain real-world coordinates 206.

At stage 308, an image validation message is generated. For example, street viewer 110 generates image validation message 202 that client 104 transmits to image validation system 118. Example image validation message 202 includes an image ID associated with image 124, real-world coordinates 206 obtained using position locator 114, client credentials 208 and user credentials 210.

At stage 310, an image validation message is transmitted. For example, image validation message 202 is transmitted to image validation system 118. As described herein, image validation system 118 determines whether real-world coordinates 206 accurately represent a location of image 124.

Figure 4:
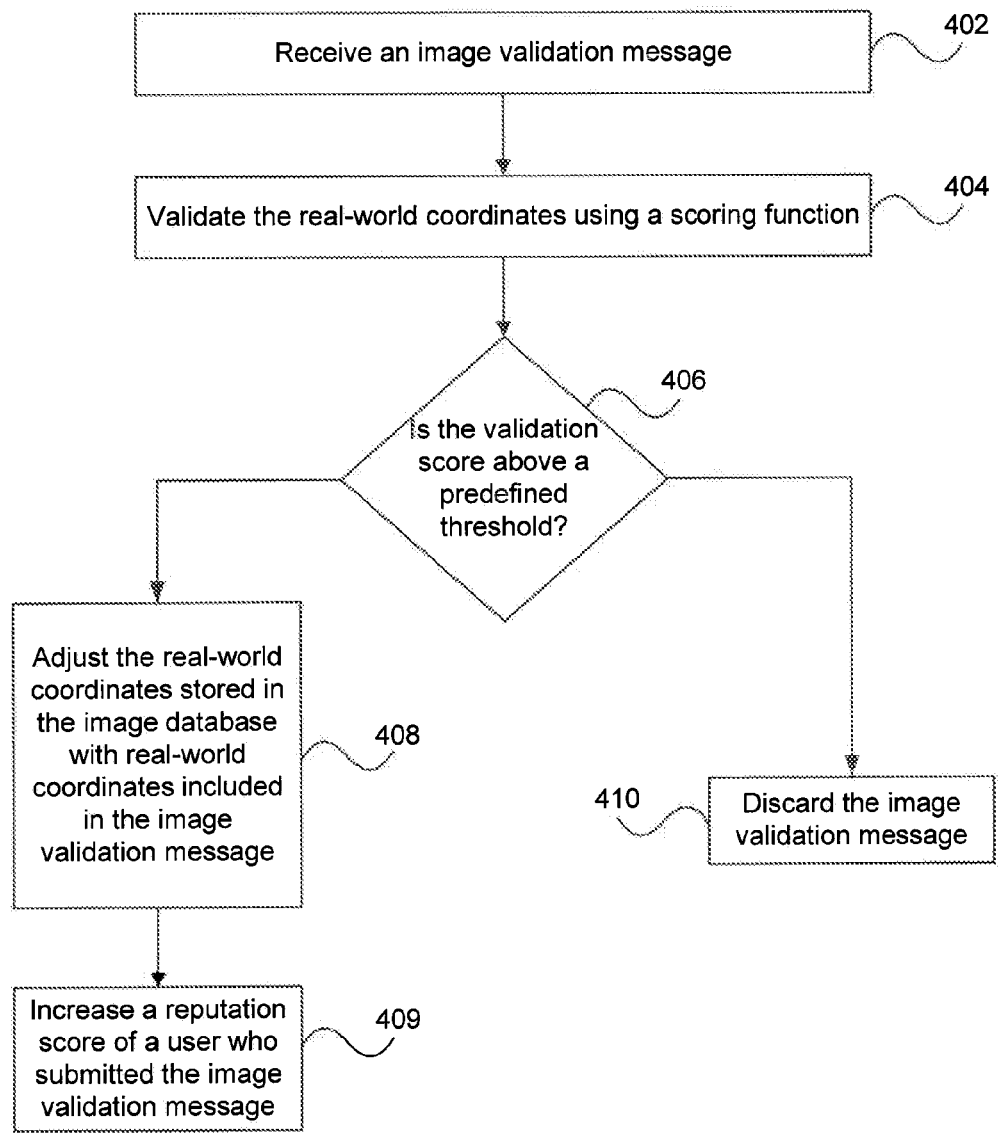
FIG. 4 is a flowchart showing a method for updating a real-world location of an image, according to an embodiment.

FIG. 4 is a flowchart of a method 400 for validating a real-world location of an image, according to an embodiment.

At stage 402, an image of a real-world location is received. For example, image validation system 118 receives image validation message 202 that includes real-world coordinates 206 of a location of image 124 that is displayed on client 104.

At stage 404, a validation score is determined. For example, image validation system 118 determines a validation score that represents the accuracy of real-world coordinates 206 with respect to image 124. In an embodiment, validation calculator generates a validation score based on the validation criteria described herein.

At stage 406, an image validator determines whether the validation score is above a predefined threshold. For example, validation calculator 212 determines whether the validation score is greater than a configurable predefined threshold. If the validation score is greater than the threshold, the flowchart proceeds to stage 408, otherwise real-world coordinates 206 are discarded at stage 410.

At stage 408, real-world coordinates adjusts image coordinates for an image. For example, image validation system 118 transmits real-world coordinates 206 to input data 113 in image database 112. In an embodiment, image database 112 replaces or adjusts image coordinates 122 with real-world coordinates 206, as described herein.

At stage 409, a score of a user is updated. For example, image validation system 118 may send a user profile update message to user profile database 117. User profile update message may cause an update in a reputation score of a user who submitted image validation message 202.

Figure 5:
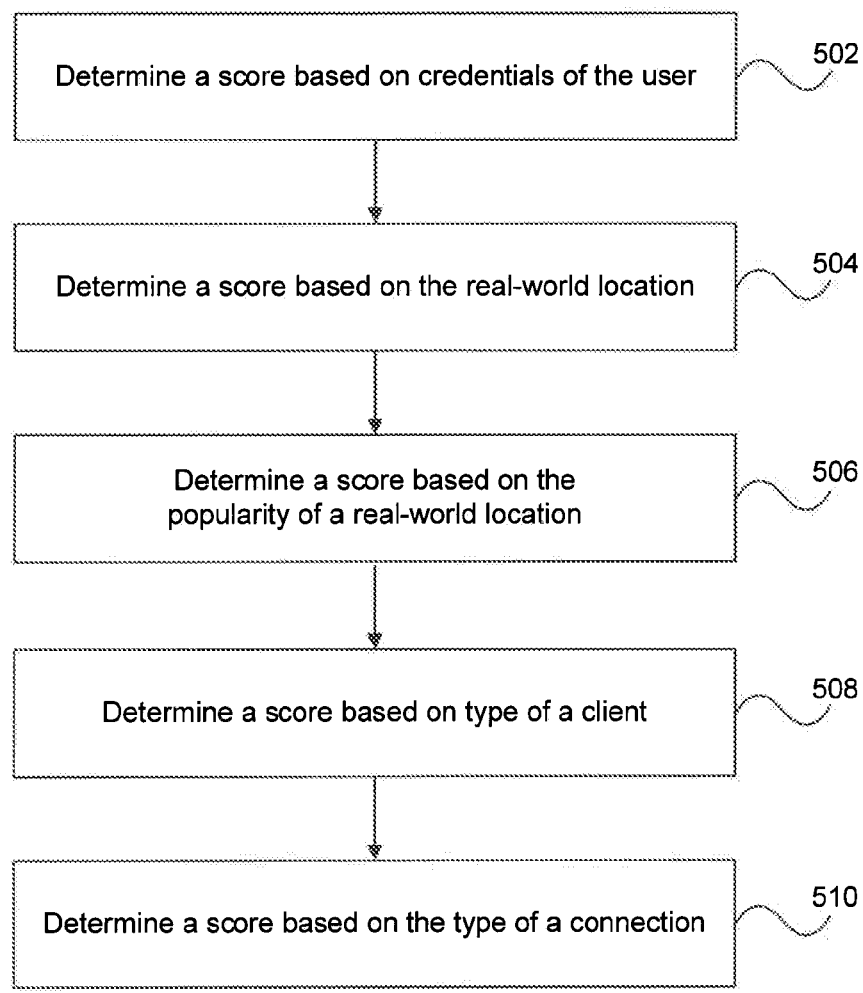
FIG. 5 is a flowchart of a method for determining a validation score, according to an embodiment.

FIG. 5 is a flowchart of a method 500 for determining a validation score. The validation score may be a combined score of some or all stages 502-510 included in flowchart 500. A person skilled in the art will appreciate that the criteria included in stages 502-510 in flowchart 500 is given by way of example and not limitation, and that a person skilled in the art may determine a validation score using other criteria.

At stage 502, a score based on the reputation of a user is determined. For example, validation calculator 212 determines a reputation score of a user based on the number of image validation messages 202 that a user submits for validation and the number of submitted real-world coordinates 206 that validation calculator 212 determined as being above a predefined threshold.

At stage 504, a score based on the density of the location of an image is determined. For example, validation calculator 212 determines a score based on whether the location of image 124 is in an urban canyon or in an open area, as described herein.

At stage 506, a score based on the popularity of a real-world location is determined. For example, validation calculator 212 accesses image database 112 and queries the number of times image 124 having image ID 204 was requested by street viewer 110. Based on the number of the requests, validation calculator 212 determines a score, as described herein.

At stage 508, a score based on a type of a client is determined. For example, the accuracy of the coordinates may correspond to a type of client 104, as the type of client 104 corresponds to the GPS device that position locator 114 on client 104 uses to obtain real-world coordinates 206. The validation score for each type of client 104 may be configured in image validation system 118, as described herein.

At stage 510, a score based on a type of a connection is determined. For example, validation calculator 212 may generate a higher connection score for client 104 that uses a particular type of a connection, such as a mobile connection, and a lower connection score for a Wi-Fi connection. The connection score based on the connection type may be configured in image validation system 118, as described herein.

Exemplary Computer System

Figure 6:
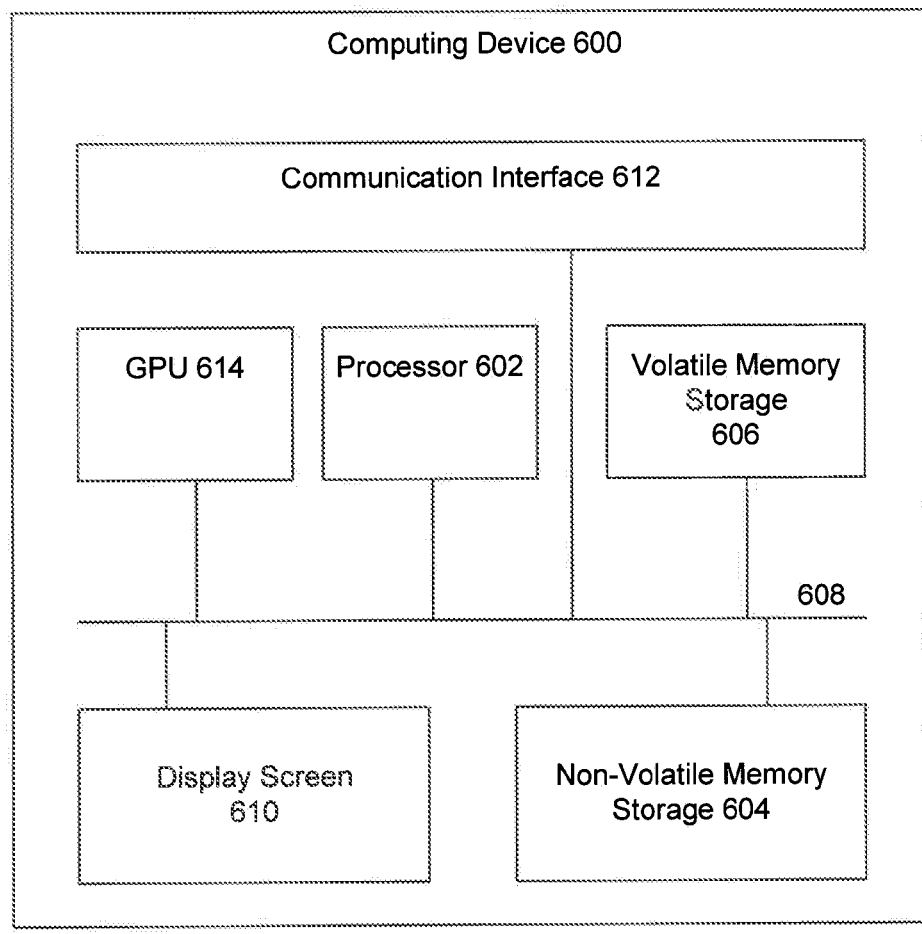
FIG. 6 is a block diagram of a computer system in which embodiments of the invention can be implemented.

FIG. 6 is an example computer system 600 in which embodiments of the present invention, or portions thereof, may be implemented as computer-readable code. For example, the components or modules of system 100, such as street viewer 110, position locator 114, validation calculator 212, etc., may be implemented in one or more computer systems 600 using hardware, software, firmware, tangible computer-readable media having instructions stored thereon, or a combination thereof and may be implemented in one or more computer systems or other processing systems. Modules and components in FIGS. 1-5 may be embodied in hardware, software, or any combination thereof.

Client 104 or web server 106 may include one or more computing devices. Client 104 or web server 106 may include one or more processors 602, one or more non-volatile storage mediums 604, one or more memory devices 606, a communication infrastructure 608, a display screen 610 and a communication interface 612.

Processors 602 may include any conventional or special purpose processor, including, but not limited to, digital signal processor (DSP), field programmable gate array (FPGA), and application specific integrated circuit (ASIC).

GPU 614 is a specialized processor that executes instructions and programs, selected for complex graphics and mathematical operations, in parallel. For example, GPU 614 may be adept at displaying and processing images of real-world locations on client 104.

Non-volatile storage 604 may include one or more of a hard disk drive, flash memory, and like devices that may store computer program instructions and data on computer-readable media. One or more of non-volatile storage device 604 may be a removable storage device.

Memory devices 606 may include one or more volatile memory devices such as but not limited to, random access memory. Communication infrastructure 608 may include one or more device interconnection buses such as Ethernet, Peripheral Component Interconnect (PCI), and the like.

Typically, computer instructions are executed using one or more processors 702 and can be stored in non-volatile storage medium 704 or memory devices 706.

Display screen 610 allows results of the computer operations to be displayed to a user or an application developer.

Communication interface 612 allows software and data to be transferred between computer system 600 and external devices. Communication interface 612 may include a modem, a network interface (such as an Ethernet card), a communications port, a PCMCIA slot and card, or the like. Software and data transferred via communication interface 612 may be in the form of signals, which may be electronic, electromagnetic, optical, or other signals capable of being received by communication interface 612. These signals may be provided to communication interface 612 via a communications path. The communications path carries signals and may be implemented using wire or cable, fiber optics, a phone line, a cellular phone link, an RF link or other communications channels.

Embodiments also may be directed to computer program products comprising software stored on any computer-useable medium. Such software, when executed in one or more data processing device, causes a data processing device(s) to operate as described herein. Embodiments of the invention employ any computer-useable or readable medium. Examples of computer-useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A computer-implemented method, comprising:
   receiving, by one or more processors, from a client device, a device geographic coordinate corresponding to a location of the client device and an indication that an image corresponds to an area near the device geographic coordinate, wherein the client device has access to the image, the image is associated with a first geographic coordinate, and the device geographic coordinate is different from the first geographic coordinate;
   determining, by the one or more processors, whether the received device geographic coordinate more accurately represents a location of a camera that took the image than the first geographic coordinate; and
   when the received device geographic coordinate is determined to be more accurate than the first geographic coordinate, updating, by the one or more processors, the first geographic coordinate associated with the image based at least in part on the received device geographic coordinate.

2. The computer-implemented method of claim 1, further comprising:
   receiving a request for an image at a particular location; and
   when the particular location of the request is determined to be in proximity to the updated first geographic coordinate, providing the image in response to the request.

3. The computer-implemented method of claim 1, wherein the determining comprises:
   determining a score; and
   determining that the received device geographic coordinate more accurately represents the location of the camera that took the image than the first geographic coordinate based on the determined score.

4. The computer-implemented method of claim 1, wherein the determining comprises determining a score based, at least in part, on a reputation score of a user that caused the client device to provide the device geographic coordinate, the reputation score indicating a degree of reliability of geographic coordinates provided by the user.

5. The computer-implemented method of claim 4, further comprising:
   when the received device coordinate is determined to be more accurate than the first geographic coordinate, updating the reputation score of the user to increase the degree of reliability indicated by the reputation score.

6. The computer-implemented method of claim 1, wherein the determining comprises determining a score based, at least in part, on a quantity of buildings in proximity to the first geographic coordinate.

7. The computer-implemented method of claim 1, wherein the determining comprises determining a score based, at least in part, on a frequency that the image has been provided in response to one or more requests from client devices.

8. The computer-implemented method of claim 1, wherein the determining comprises determining a score based, at least in part, on a credential of the client device.

9. The computer-implemented method of claim 8, wherein the determining the score is based, at least in part, on a type of the client device.

10. The computer-implemented method of claim 8, wherein the determining the score is further based, at least in part, on a location determining technique used by the client device to determine the second geographic coordinate.

11. The computer-implemented method of claim 3, wherein the determining that the received device geographic coordinate more accurately represents the location of the camera that took the image than the first geographic coordinate based on the determined score comprises determining that the received device geographic coordinate more accurately represents the location of the camera that took the image than the first geographic coordinate when the score exceeds a predetermined threshold.

12. A system, comprising:
a server, comprising one or more computing devices, configured to:
receive, from a client device, a device geographic coordinate corresponding to a location of the client device and an indication that an image corresponds to an area near the device geographic coordinate, wherein the client device has access to the image, the image is associated with a first geographic coordinate, and the device geographic coordinate is different from the first geographic coordinate;
a validation module configured to:
determine whether the received device geographic coordinate more accurately represents a location of a camera that took the image than the first geographic coordinate; and
when the received device geographic coordinate is determined to be more accurate than the first geographic coordinate, updating the first geographic coordinate associated with the image based at least in party on the received device geographic coordinate.

13. The system of claim 12, further comprising an image storage configured to:
store a plurality of images;
receive a request for an image in the plurality of images at a particular location; and
when the particular location of the request is determined to be in proximity to the updated first geographic coordinate, provide the image in response to the request.

14. The system of claim 12, wherein the validation module is further configured to:
determine a score; and
determine that the received device geographic coordinate more accurately represents the location of the camera that took the image than the first geographic coordinate based on the determined score.

15. The system of claim 12, wherein the validation module is further configured to determine a score based, at least in part, on a reputation score of a user that caused the client device to provide the device geographic coordinate, the reputation score indicating a degree of reliability of geographic coordinates provided by the user.

16. The system of claim 12, wherein the validation module is further configured to determine a score based, at least in part, on one or more of:
a quantity of buildings in proximity to the first geographic coordinate;
a frequency that the image has been provided in response to one or more requests from client devices; and
a credential of the client device.

17. The system of claim 14, wherein the validation module is further configured to determine that the received device geographic coordinate more accurately represents the location of the camera that took the image than the first geographic coordinate based on the determined score when the determined score exceeds a predetermined threshold.

18. A non-transitory computer-readable medium having instructions stored thereon that, when executed by one or more processors, cause the one or more processors to perform operations, the operations comprising:
receiving, from a client device, a device geographic coordinate corresponding to a location of the client device and an indication that an image corresponds to an area near the device geographic coordinate, wherein the client device has access to the image, the image is associated with a first geographic coordinate, and the device geographic coordinate is different from the first geographic coordinate;
determining whether the received device geographic coordinate more accurately represents a location of a camera that took the image than the first geographic coordinate; and
when the received device geographic coordinate is determined to be more accurate than the first geographic coordinate, updating the first geographic coordinate associated with the image based at least in part on the received device geographic coordinate.

19. The non-transitory computer-readable medium of claim 18, the operations further comprising:
receiving a request for an image at a particular location; and
when the particular location of the request is determined to be in proximity to the updated first geographic coordinate, providing the image in response to the request.

20. The non-transitory computer-readable medium of claim 18, the operations further comprising:
determining a score; and
determining that the received device geographic coordinate more accurately represents the location of the camera that took the image than the first geographic coordinate based on the determined score.

* * * * *

UNITED STATES PATENT AND TRADEMARK OFFICE
CERTIFICATE OF CORRECTION

Page 1 of 1

PATENT NO. : 8,965,040 B1
APPLICATION NO. : 14/182872
DATED : February 24, 2015
INVENTOR(S) : Stephen Chau It is certified that error appears in the above-identified patent and that said Letters Patent is hereby corrected as shown below:

In the Claims

Column 13, line 36, "party" should read -- part --.

Signed and Sealed this
Eighth Day of September, 2015

Michelle K. Lee
*Director of the United States Patent and Trademark Office*